Dec. 12, 1950 E. W. WEISSERT 2,533,748
SELF-LOCKING SET SCREW
Filed March 17, 1948 2 Sheets-Sheet 1
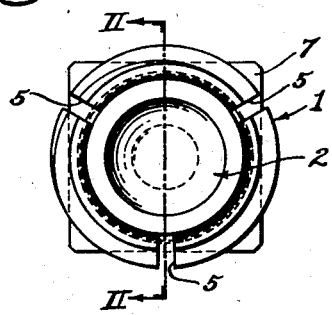
Fig. I
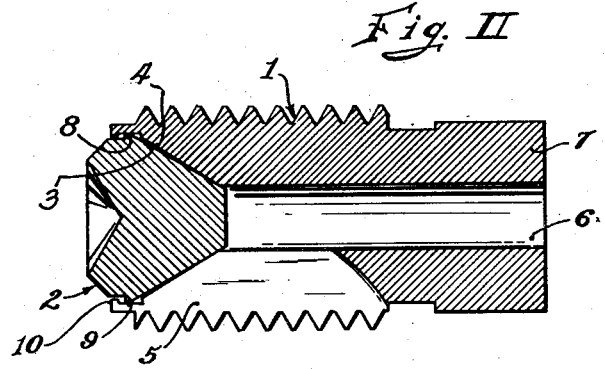
Fig. II
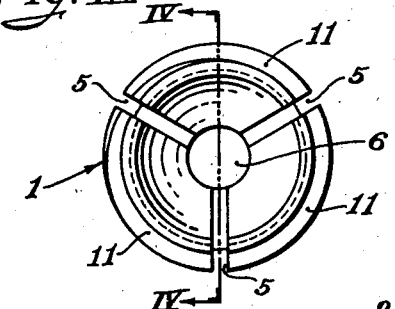
Fig. III
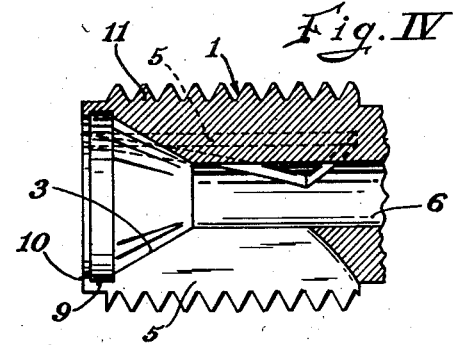
Fig. IV
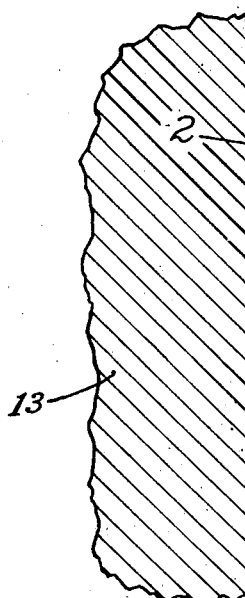
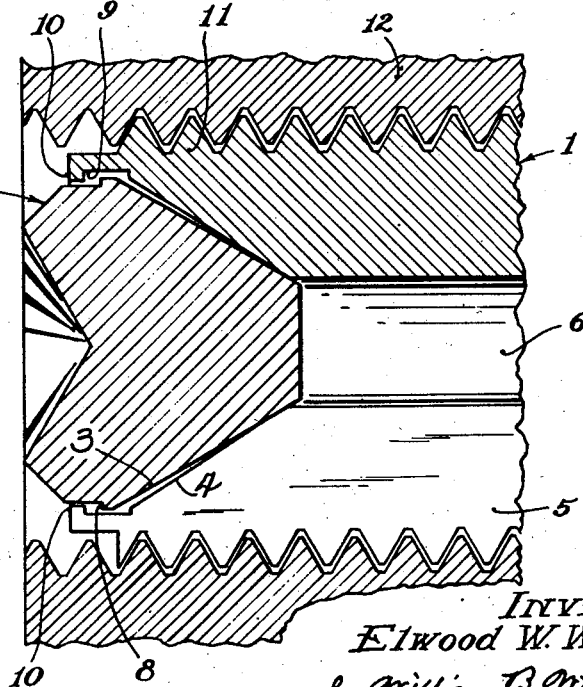
Fig. V
INVENTOR
Elwood W. Weissert
by William B. Wharton
his attorney

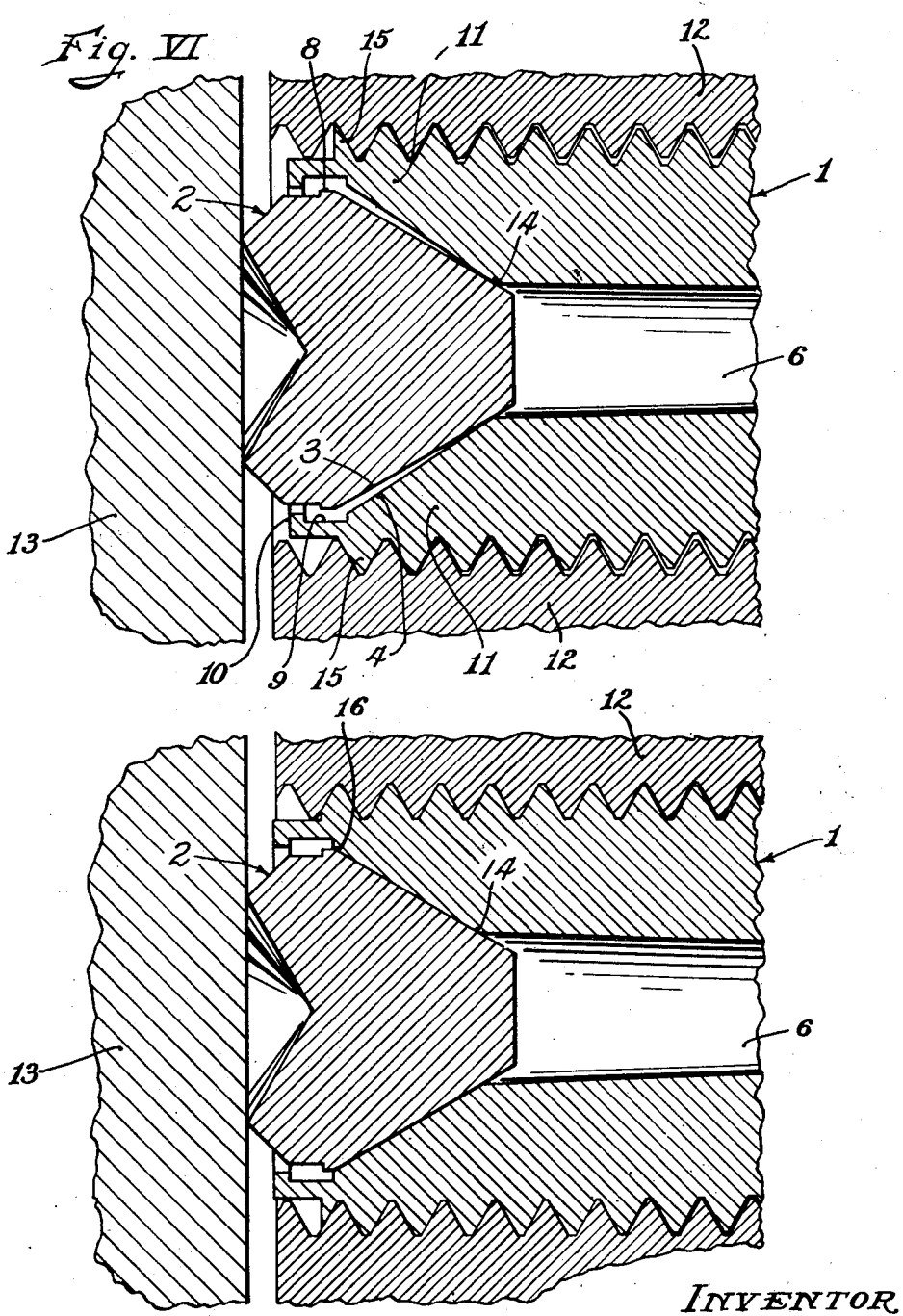

Patented Dec. 12, 1950

2,533,748

UNITED STATES PATENT OFFICE 2,533,748

SELF-LOCKING SETSCREW

Elwood W. Weissert, Carnegie, Pa., assignor to Bertrand P. Tracy Company, Pittsburgh, Pa., a corporation of Pennsylvania Application March 17, 1948, Serial No. 15,322

4 Claims. (Cl. 151—32)

This invention relates to a self-locking set screw.

In many associations, as in interconnecting elements in machines or other instrumentalities which are subjected to shocks, jars and vibration in their use or operation, it is important that the set screw should so bind in the cooperatively threaded socket of the element in which it runs that it is proof against loosening under the conditions to which it is subjected. It also is important that the set screw be removable by intent for disassembly of the parts or elements which it interconnects without injury to those structures. A typical illustration of an assembly of such type that a set screw of the indicated sort is an important element, is in the cutter chains of coal-mining machines. In such association a cutter bit is inserted into a slot in a bit-carrying link of the chain and is held in position by the pressure of a set screw. It is obviously important that the set screw used in that assembly should be firmly locked against the loosening forces encountered in use of the cutter chain and that it be removable without destructive effect on the parts. Many other associations in which analogous conditions exist will come readily to mind.

A primary object of the invention is to provide a self-locking set screw which presents the above described advantages of firmly locked engagement in its functional position coupled with ready removability from such position.

Another object of the invention is to provide in a self-locking set screw comprising an expansible body or shell and a bearing tip, such cooperative contours of the body and bearing tip that in tightening movement of the set screw the tightening or binding effect takes place progressively to produce a binding effect between a maximum number of threads of the set screw and the socket in which it runs in arriving at a solid bearing of the body or shell on the bearing tip.

Another object of the invention is to provide a self-locking set screw capable of the above action, in which the bearing tip is held in alignment during the progress of the tightening action.

Another object of the invention is to provide in a self-locking set screw comprising an expansible body or shell and a bearing tip, such engagement between the tip and the body that the tip is normally secured to the body but is removable therefrom and replaceable therein.

Briefly to describe the primary features of a set screw embodying my invention, I provide an externally threaded body having a bore therein. This body, or shell, is slotted longitudinally from its forward end, and a bearing tip has interlocking engagement with the interior structure of the body at the forward end of the bore. The contacting surfaces of the tip and of the body or shell are tapered, with the forward flare of the body surface being at a slightly greater angle than the angle on which the cooperative surface of the tip is formed. Thus as the body or shell of the set screw is moved forwardly over the tip with the tip in abutment with a solid surface, the progressive expansion of the slotted shell brings a maximum number of the set screw threads into binding engagement with the threads of the socket into which the set screw is inserted. As the set screw is retracted, the slotted region of its body can contract as the binding of the threads is loosened and the angular surface of the body slides rearwardly on the tip. The interlocking engagement between the slotted body of the set screw and the tip is such as to provide lost motion for forward movement of the body over the tip, and such as to permit both insertion and removal of a tip by spreading the forward segments or jaws of the set screw body.

In the accompanying drawings:

Fig. I is a forward end view of the set screw assembly.

Fig. II is a longitudinal sectional view of the screw assembly taken on the line II—II of Fig. I.

Fig. III is a view similar to Fig. I with the bearing tip removed from the body of the set screw.

Fig. IV is a fragmentary longitudinal sectional view of the body taken on the line IV—IV of Fig. III.

Fig. V is a fragmentary sectional view of an enlarged scale showing the forward end of the set screw in a threaded socket and with the bearing tip of the set screw adjacent but out of contact with the surface of an element against which pressure is to be exerted.

Fig. VI is a view similar to Fig. V showing the primary stage of the locking action as the bearing tip is brought into contact with the abutment surface.

Fig. VII is a view similar to Fig. V showing the final stage of the locking action after the screw has been run fully into locking position against the said element.

Referring initially to Figs. I and II of the drawings, the set screw comprises a threaded body 1 and a primarily conical bearing tip 2, formed as an individual structure and having a peripheral surface 3. The body of its forward region is recessed to receive the tip within the bounds of a conical surface 4 formed interiorly of the set screw body in a region thereof provided with a plurality of slots 5 to permit resilient spreading of the body segments separated by the slots.

Desirably the set screw body 1 is of tubular or sleeve form having a bore 6 extended throughout its entire length. In Fig. II of the drawings the rearward end of body 1 is shown squared in a region 7 to provide for engagement by a wrench. Alternatively or additionally the rearward end of bore 6 may be formed to provide wrench engagement.

The set screw comprising body 1 and bearing tip 2 is integrated into a single unit for the sake of convenience in storage and handling, and also for purposes of convenience and utility the engagement between the body and tip is such that the tip readily may be removed from and replaced in the recessed forward end of the body. As shown, such engagement is provided by an extension 8 in the form of a shouldered peripheral ridge or band located rearwardly of the contact point of the tip and forwardly of conical surface 3. Interiorly of the sleeve or body 1 and forwardly of conical surface 4 therein there is a circular groove or channel 9 terminating in a lip 10 extended radially inward beyond shoulder 8 of the tip. As shown clearly in Figs. V, VI and VII of the drawings, channel 9 is of sufficient width with respect to the width of peripheral shoulder 8 on the tip to permit relative movement between the sleeve or body and the tip without destroying the interlocked engagement provided by the opposed surfaces of lip 10 and shoulder 8.

In making assembly of the set screw the smaller dimension of the bearing tip is inserted into the recess at the forward end of the set screw body and the tip is forced rearwardly therein until peripheral ridge 8 at the forward end of conical surface 3 snaps past lip 10 of the body to lie within channel 9. This action is permitted by the resilient flexibility of the segments or jaws 11 separated and defined by longitudinal slots 5. In this position the bearing tip is loosely but securely engaged at the forward end of the sleeve or body. If it should become necessary or desirable to remove and replace bearing tip 2 because of wear or damage, or in order to replace the initial tip with one formed of metal of different sort or having a different order of hardness, the tip can be forced past lips 10 and segments 11 and out of the groove 9 therein by driving against the tip with a pin inserted from the rearward end of bore 6.

It is to be understood of course that the locking engagement of the set screw in the threaded socket in which it runs is effected by expansion of the set screw body or rather of the segments or jaws 11 of the forward region of the set screw body by forward movement of that body over the bearing tip with the tip bearing against a solid abutment. In such action the inclination of conical surfaces 3 of the bearing tip and 4 of the set screw body by the cooperative action and opposite inclination cause the jaws or segments 11 to be forced outwardly. Such radial outward or expanding movement of segments or jaws 11 causes the threads of those jaws to bind against the threads of the socket in a structure 12 surrounding the set screw.

I have discovered that in order to give stability in the bearing between the body segments and the bearing tip to cause a sufficiently great number of cooperative threads on the set screw jaws and in its socket adequately to bind or jam, there should be a difference in the angle describing the cooperative surfaces in the set screw body and on the bearing tip. That is, the recess in the set screw body should flare outwardly at a different angle than the forward spread of the bearing tip. Further and as a matter of great importance, I have discovered that the greater angularity should be in the outward flare of the body recess and not in the forwardly progressive increase in cross-sectional area of the bearing tip.

Considering an exact matching in the angularity in the surfaces as providing a basic angle for their development, the conical surface 4 in the recess of the segments may be considered to be formed on the basic angle $+a$, the conical surface 3 of the bearing tip being considered as providing the basic angle. The value of $a$ is limited as a maximum by the requirement that at the forward limit of movement of the set screw body the metal of which the expansible segments of that body are composed must not be flexed beyond the limit of its strength and elasticity in attaining an ultimate solid bearing in the bearing tip. The value of $a$ thus is never great. When the body or shell of the set screw is made of steel which is of suitable grade for the purpose, it is possible and usually is desirable that the angularity of the surface 4 formed on the interior of the segments be from about ¼° to 1° greater than the angle on which the cooperative surface 3 of the bearing tip is formed.

The more clearly to illustrate the actual progressive steps of the gripping or locking action of the set screw as it is advanced in the socket of structure 12, I now refer to Figs. V to VII inclusive of the drawings, which are shown in fragmentary manner and on a greatly enlarged scale. The difference in angle between the bearing area 3 of the body and the corresponding bearing surface 4 of the bearing tip is shown as slightly exceeding the desired maximum. Also for clearness I have exaggerated the "fit" or clearance between the threads of the screw body 1 and the socket threads in structure 12.

Fig. V shows the embodiment of my invention prior to contact of the bearing tip 2 with an abutment surface 13. When the bearing tip 2 makes contact with surface 13, as illustrated in Fig. VI, the bearing area 3 and the corresponding bearing surface 4 come into contact at a point 14 on the body, thus creating a stable condition of the bearing tip which gives stability and resists "tumbling." This contact at point 14 spreads the jaws 11 outwardly, bringing the first thread 15 into firm contact with the confining threads of structure 12.

As tightening of the screw continues, point 14 of the body advances forward or up on the conical shaped bearing surface 4, thus bringing more threads of the set screw body into firm contact with the confining threads of the socket, as shown in Fig. VII. Also as tightening continues the body is forced into contact with the bearing tip at point 16, thus entirely closing the gap or space between the screw body and the bearing tip. Consequently the set screw, when tightened or anchored in position, forms in effect a solid contact between the bearing tip and the structure comprising abutment surface 13 as well as between the bearing tip and the set screw body to prevent shocks, jars or vibration from loosening the set screw.

It will readily be understood by consideration of Figs. V, VI and VII of the drawings that the clearance, or tolerance, provided by the greater angle on which the contact surfaces 4 of segments 11 are formed is of primary importance in obtaining satisfactory performance by the set screw. Thus, this clearance permits the contact point, or line 14 to move progressively forward on bearing tip 2 with progressive closing of the gap provided by the angular difference, to bring additional threads of the set screw and socket progressively into binding relation rearwardly of the set screw. If we assume that the cooperative conical surfaces of the bearing tip and body segments are formed on the same angle, or that the addition to such basic angle is utilized in the formation of the tip, that clearance is inadequately or improperly provided. If both be formed on the same angle, there will be a transitory clearance as the segments first are deflected angularly away from the surface of the bearing tip. Tightening action, however, quickly absorbs that tolerance and brings the elements into a jammed relation which inhibits rearwardly progressive binding between the threads of the set screw and the socket. Even a very slight increase in the angularity of the segment surfaces over the angularity of the cooperative surface of the bearing tip increases clearance and thus tends to prolong the progress of the binding effect and to obtain increased firmness in the integration of the assembly. An approach to the practical maximum in the greater angularity of the outwardly flaring surface in the set screw body, gives optimum results. If the conical surface of the bearing tip be formed on an angle greater than the angle on which the cooperative surfaces of segments 11 are formed, the inhibition to progressive rearward binding of the threads occurs with the first tightening action. Such structure thus sacrifices perfection in the tightening action to rapidity in arriving at a locked engagement. Experiments have shown that with either of those structures the locking effect is inadequate enduringly to maintain the set screw and the parts or elements interconnected by it in firm, tight assembly against the loosening tendencies resulting from shocks, jars and vibration.

Also, with the structure last described, the initial bearing between the segments of the set screw body being at a forward point on the bearing tip, creates a tendency toward "tumbling" i. e. rocking from a position of alignment in forward movement of the set screw body in the tightening action.

To remove the set screw from the structure in which it runs, a forceful turning movement exerted at the rear of the set screw body will move the body backwardly on the bearing tip, thus permitting the jaws to begin a radially inward movement returning them to their normal position. A continued backing out of the set screw brings the lip 10 provided by channel 9 of the body segments into direct contact with the enlarged shoulder 8, thus providing an interlocking action between the jaws and tip, to maintain integration between the tip and body during retraction of the body.

I have herein shown and described one specific form of set screw embodying the fundamental features of my invention and it is to be understood that I do not intend to limit myself to details set forth by way of illustration, but that my invention is to be assumed to embrace such changes and modifications as come within the scope of the claims appended hereto.

I claim as my invention:

1. A self-locking set screw comprising a body having a recess in its forward region, slots extended rearwardly from the forward recessed end of the set screw body dividing the structure thereof into a plurality of externally threaded segments, the said segments being interiorly formed cooperatively to provide a conical forwardly flaring surface within the segmented forward region of the set screw body, a bearing tip having a conical rearwardly tapered bearing surface cooperative with the forwardly flaring conical surface of the set screw body to cause radial expansion of the externally threaded body segments as the body of the set screw is moved forwardly over the said bearing tip; the angle at which the conical surface of the body segments flares being greater than the angle on which the diameter of the bearing tip progressively increases in an order to provide clearance around the forward region of the said bearing tip in movement of the said body segments thereover and the difference between said angles being less than the angle of deflection required to flex the segments to their elastic limit.

2. A self-locking set screw in accordance with the definition of claim 1 in which the bearing tip has thereon a peripheral shouldered projection lying within a groove of greater width provided interiorly of the body segments adjacent their forward extremities.

3. A self-locking set screw comprising a body having a recess in its forward region, slots extended rearwardly from the forward recessed end of the set screw body dividing the structure thereof into a plurality of externally threaded segments, the said segments being interiorly formed cooperatively to provide a conical forwardly flaring surface within the segmented forward region of the set screw body, a bearing tip having a conical rearwardly tapered bearing surface cooperative with the forwardly flaring conical surface of the set screw body to cause radial expansion of the externally threaded body segments as the body of the set screw is moved forwardly over the said bearing tip; the angle at which the conical surface of the body segments flares being from about ¼° to 1° greater than the angle on which the diameter of the bearing tip progressively increases, to provide clearance around the forward region of the said bearing tip in movement of the said body segments thereover.

4. A self-locking set screw in accordance with the definition of claim 3 in which the bearing tip has thereon a peripheral shouldered projection lying within a groove of greater width provided interiorly of the body segments adjacent their forward extremities.

ELWOOD W. WEISSERT.

REFERENCES CITED

The following references are of record in the file of this patent:

UNITED STATES PATENTS

| Number | Name | Date |
| --- | --- | --- |
| 1,324,012 | Johnson | Dec. 2, 1919 |
| 1,438,648 | Jacobs | Dec. 12, 1922 |
| 1,672,879 | Campbell | June 12, 1928 |